United States Patent [19]
Hollis

[11] Patent Number: 5,522,179
[45] Date of Patent: Jun. 4, 1996

[54] AUTOMATIC CHRISTMAS TREE STAND WATER LEVEL CONTROL SYSTEM

[76] Inventor: Peter R. Hollis, 7743 Copperfield Ct., Baton Rouge, La. 70808

[21] Appl. No.: 409,516

[22] Filed: Mar. 23, 1995

[51] Int. Cl.⁶ .............................. A47G 7/02; A47G 33/12
[52] U.S. Cl. ........................ 47/40.5; 248/79; 248/213.2; 248/439; 137/451
[58] Field of Search ...................... 137/434, 451, 137/448, 438; 248/213.2, 79; 47/40.5

[56] References Cited

U.S. PATENT DOCUMENTS

| | | | |
|---|---|---|---|
| 107,448 | 9/1870 | Chandler | 137/443 |
| 2,013,204 | 9/1935 | Delano | 248/79 |
| 2,145,052 | 1/1939 | Luno | 137/139 |
| 3,469,342 | 9/1967 | Morris | 47/38 |
| 3,863,663 | 2/1975 | Bornhorst | 137/451 |
| 4,281,625 | 8/1991 | Kasai | 119/77 |
| 4,586,532 | 5/1986 | Tsolkas | 137/446 |
| 4,653,224 | 3/1981 | Weckesser | 47/40.5 |
| 4,825,587 | 5/1989 | Stanck | 47/40.5 |
| 4,930,252 | 6/1990 | Kaause et al. | 47/40.5 |
| 4,993,176 | 2/1991 | Spinosa | 40/40.5 |
| 5,076,009 | 12/1991 | Cibor | 47/40.5 |
| 5,090,443 | 2/1992 | Jacobsen | 137/429 |
| 5,111,611 | 5/1992 | Elder | 47/40.5 |
| 5,157,868 | 10/1992 | Munoz | 47/40.5 |
| 5,201,140 | 4/1993 | Voorhis | 47/40.5 |
| 5,279,071 | 1/1994 | McDougall | 47/40.5 |
| 5,327,677 | 12/1994 | Rivera | 47/40.5 |

FOREIGN PATENT DOCUMENTS

| | | | |
|---|---|---|---|
| 1034390 | 6/1966 | United Kingdom | 137/448 |

*Primary Examiner*—Henry E. Raduazo
*Attorney, Agent, or Firm*—Joseph N. Breaux

[57] ABSTRACT

An automatic water level control system, for use in conjunction with a Christmas tree stand of the type having a watering basin with an outer rim and a tree clamping mechanism for holding the Christmas tree in an upright manner with the base portion of the tree disposed within the watering basin. The water level control system includes a water supply container, a flexible conduit, an attachment mechanism, and a valve mechanism. The water supply container serves as a holding tank for water which is supplied to the watering basin of the Christmas tree stand via the flexible conduit. The water level in the watering basin is regulated by the valve mechanism attached to the Christmas tree stand. The attachment mechanism has a main body and is attachable to the outer rim of the watering basin in a manner to functionally secure the main body to the Christmas tree stand. The valve mechanism includes a watering port, a valve, and a float member. The watering port is in fluid communication with the second end of the flexible conduit member such that water flowing from the water supply container through the flexible conduit ultimately exits the watering port into the watering basin.

1 Claim, 4 Drawing Sheets

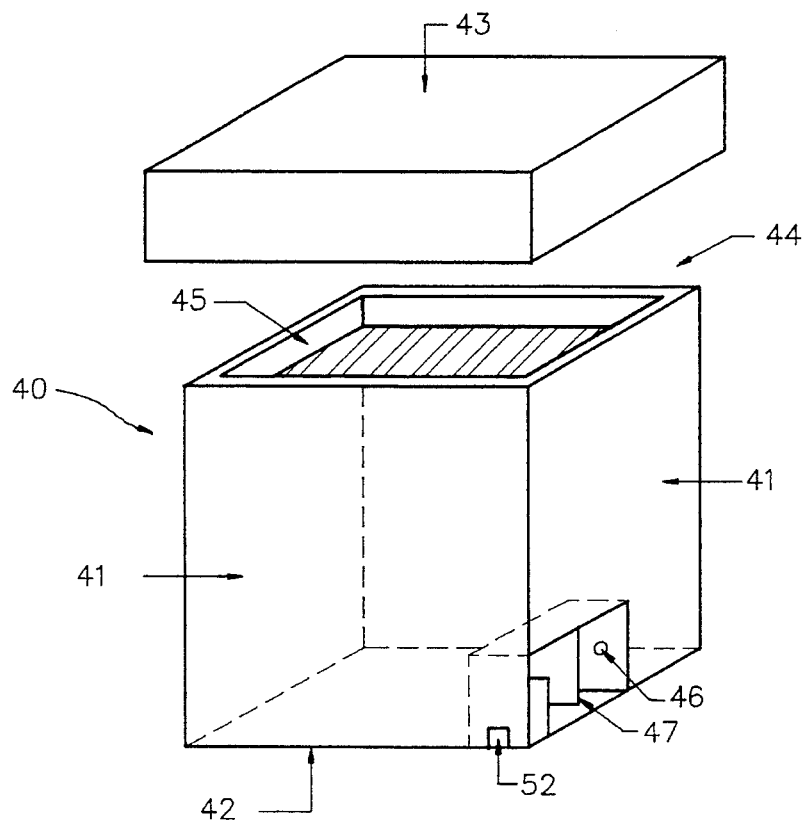
FIG. 2
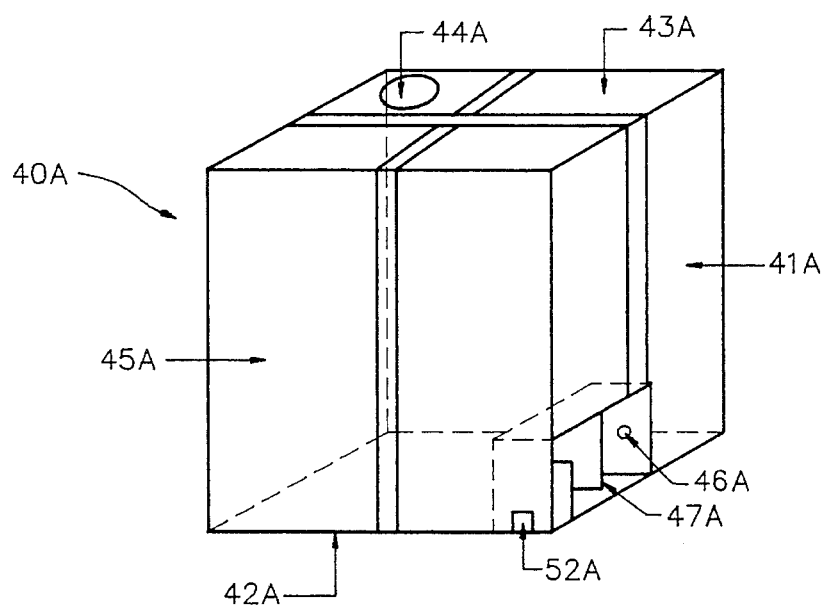
FIG. 2-A 5,522,179

AUTOMATIC CHRISTMAS TREE STAND WATER LEVEL CONTROL SYSTEM

TECHNICAL FIELD

The present invention relates to devices for controlling and maintaining water levels within the watering basin of a Christmas tree stand.

Background Art

Displaying Christmas trees within the home is a long standing and enormously popular Christmas tradition. The Christmas tree is displayed and held in an upright position by a stand and is usually surrounded by Christmas decorations and presents. The stand generally includes a watering basin within which the base of the tree is held by the holding mechanism of the stand. In order to preserve the tree in as fresh condition as possible, the watering basin should contain a supply of water which the tree may absorb through its base. Maintaining a supply of water within the watering basin can be difficult because access to the watering basin is usually blocked by the lower limbs of the Christmas tree as well as the Christmas decorations and presents surrounding the tree. It would be a benefit, therefore, to have a watering system for maintaining the water level in the basin to insure the base of the tree remains submerged in water.

Although pure water may be used within the basin to maintain the tree, it is desirable to introduce additional nutrients such as sugar into the water in order to extend the time period the tree may be used. However, the additional nutrients can pose problems to currently available water control systems for Christmas trees because unabsorbed nutrients can crystallize and accumulate on sliding components with these systems. These accumulations can result in no water being supplied to the tree or result in overflowing of the watering basin. It would be desirable, therefore, to have a watering system that had few or no sliding parts susceptible to failures caused by the accumulation of crystallized nutrients. It would also be desirable to have a watering control system that required little or no maintenance to insure proper operation.

General Summary Discussion of Invention

It is thus an object of the invention to provide an automatic water level control system that will maintain a relatively constant water level in the watering basin of a Christmas tree stand.

It is a further object of the invention to provide an automatic water level control system that will resist jamming associated with both operation in and around liquid solutions laden with sugar or a similar substance, and floating tree debris.

It is a still further object of the invention to provide an automatic water control system which includes an adjustable attachment mechanism to facilitate operation with existing Christmas tree stands of various sizes.

It is a still further object of the invention to provide an automatic water level control system for maintaining a constant water level in a Christmas tree stand that is unobtrusive, inexpensive, and simple to install.

It is a still further object of the invention to provide an automatic water level control system that will maintain a relatively constant water level in a Christmas tree stand without attention for an extended period of time.

Accordingly, an automatic water level control system, for use in conjunction with a Christmas tree stand of the type having a watering basin with an outer rim and a tree clamping mechanism for holding the Christmas tree in an upright manner with the base portion of the tree disposed within the watering basin, is provided. The outer rim of the watering basin is the upper portion of the watering basin itself, substantially defining the perimeter of the watering basin.

The water level control system includes a water supply container, a flexible conduit, an attachment mechanism, and a valve mechanism. The water supply container serves as a reservoir for water which is supplied to the watering basin of the Christmas tree stand via the flexible conduit. The water level in the watering basin is regulated by the valve mechanism attached to the Christmas tree stand.

The water supply container has an internal reservoir cavity for holding water and a fluid opening which allows refilling of the reservoir cavity. The water supply container may also include a removable cover for the fluid opening so that foreign objects are prevented from entering the reservoir cavity, and either, contaminating the water, or clogging the flexible conduit or valve mechanism. Preferably, the water supply container is shaped in a manner to resemble a traditional Christmas item such as a Santa Claus figure, a candy cane, or Christmas present thereby blending in with the surrounding items.

The water supply container also includes an output port in fluid communication with the reservoir cavity such that water may exit the water supply container and flow into the flexible conduit and eventually to the watering basin. The output port is preferably located on the bottom of the reservoir cavity and protected from contact with children or pets playing near the tree. This may be accomplished by including a recessed cavity near the bottom of the water supply container within which the output port-flexible conduit connection is made.

The first end of the flexible conduit is in fluid communication with the output port such that water may flow between the reservoir cavity and the flexible conduit. A tension reducing mechanism is preferably located at the output port—flexible conduit connection to reduce the possibility that the flexible conduit will be pulled loose from the output port. The tension reducing mechanism is integrated into the water supply container and functions to prevent tensional stress, which might otherwise occur at the output port—flexible conduit connection, as a result of the flexible conduit being pulled.

The attachment mechanism, used to attach the valve mechanism to the Christmas tree stand, has a main body and is attachable to the outer rim of the watering basin in a manner to functionally secure the main body to the Christmas tree stand. The term "functionally secure" is used herein to mean the prevention of vertical movement of the main body while in use.

The attachment mechanism may include and utilize two hook members to grasp sections of the outer rim of the watering basin of the Christmas tree stand. In addition, at least one hook member may be extendable from the main body such that the distance between the two hook members is variable. This allows the water level control system to be used with Christmas tree stands of various shapes and sizes. Preferably, both hook members are extendable from the main body to allow for user positioning of the valve mechanism. More preferably the hook members have an extension section which slides within the main body.

The extension section could take the form of a plate, rod, or pipe, and the main body could take the form of a hollow rod, or tube with corresponding inside and outside dimensions such that the extension section would fit inside the main body. Alternatively, the main body may include opposing track members on each side forming a C-shaped raceway such that a planer shaped extension section would easily slide in and out of the main body.

The attachment mechanism may also have a shield member thereon. The shield member is preferably attached to the main body and located so that, in use, the shield member may be interposed between the valve mechanism and the base portion of the Christmas tree.

The valve mechanism includes a watering port, a valve, and a float member. The watering port is in fluid communication with the second end of the flexible conduit such that water flowing from the water supply container through the flexible conduit ultimately exits the watering port into the watering basin where it may nourish the Christmas tree. The watering port is preferably attached to the main body of the attachment mechanism and oriented towards the bottom of the watering basin when the main body is properly attached to the Christmas tree stand. This arrangement minimizes the possibility of outflowing water onto the floor supporting the tree stand. More preferably, the watering port passes through a centrally located aperture of the main body and terminates flush with the main body.

The valve regulates the flow of water from the watering port to the watering basin such that a relatively constant water level is maintained in the Christmas tree stand eliminating the constant human attention otherwise required to minimize the risk of fire and the premature deterioration of the Christmas tree. The valve operates in conjunction with the float member and may utilize a valve seat to regulate the outflow from the watering port. In use, the float member floats on the water contained in the watering basin, rising and falling, with respect to the water level in the basin. The valve seat is interconnected with the float member such that the rising and falling of the float correspondingly causes the valve seat to rise and fall with respect to the water level in the watering basin. The valve seat when properly oriented engages, thereby closing, and disengages, thereby opening, the watering port as it rises and falls. The orientation of the movable valve seat with respect to the fixed watering port is critical to the proper operation of the valve mechanism.

Although a pivoting arm may be utilized to assure proper orientation of the valve seat, it is preferred to utilize a flexion member made of resilient material to insure proper orientation of the valve seat. The flexion member is attached at its first end to the main body of the attachment assembly and the second end of the flexion member is free to move. The float body is attached to the flexion member such that, in use, movement of the float body due to buoyancy causes the flexion member to flex or bend in a predetermined direction. The valve seat is connected to either the float body or flexion member such that the bending of the flexion member in its predetermined direction properly orients the valve seat with respect to the watering port forcing the valve seat to engage or disengage the watering port at predetermined watering basin water levels. The flexion member may be attached to the main body mechanically, such as with an adhesive, or be integrally formed with the main body during its manufacture. The valve mechanism operates in an environment susceptible to tree sap, tree fragments, and sticky sugar water solutions. Since no sliding parts are required for the operation of the flexion member the potential for jamming or improper orientation of the valve seat due to the environment within which it operates is minimized. The flexion member is constructed of a resilient material such that movement of its second end, as a result of the float members movement, will not damage its integrity.

The float member is preferably positioned vertically below the flexion member and the valve seat is positioned vertically above the flexion member such that the valve seat remains above the fluid level in the watering basin at all times. By placing the valve seat above the fluid level in the watering basin, the valve seat is protected from the potentially damaging environment that may include tree sap, tree fragments, and sticky water solutions. More preferably all or a portion of the flexion member is located between the main body and the bottom section of the watering basin when the main body is attached to the Christmas tree stand. It is still more preferred that the valve seat be a step button having a sealing surface formed of a resilient material. This valve seat configuration further assures a proper seal when the valve seat is engaged with the watering port.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2 is a perspective view of an exemplary embodiment of the water supply container.

FIG. 2A is a perspective view of a second exemplary embodiment of the water supply container.

EXEMPLARY MODE FOR CARRYING OUT THE INVENTION

Figure 1:
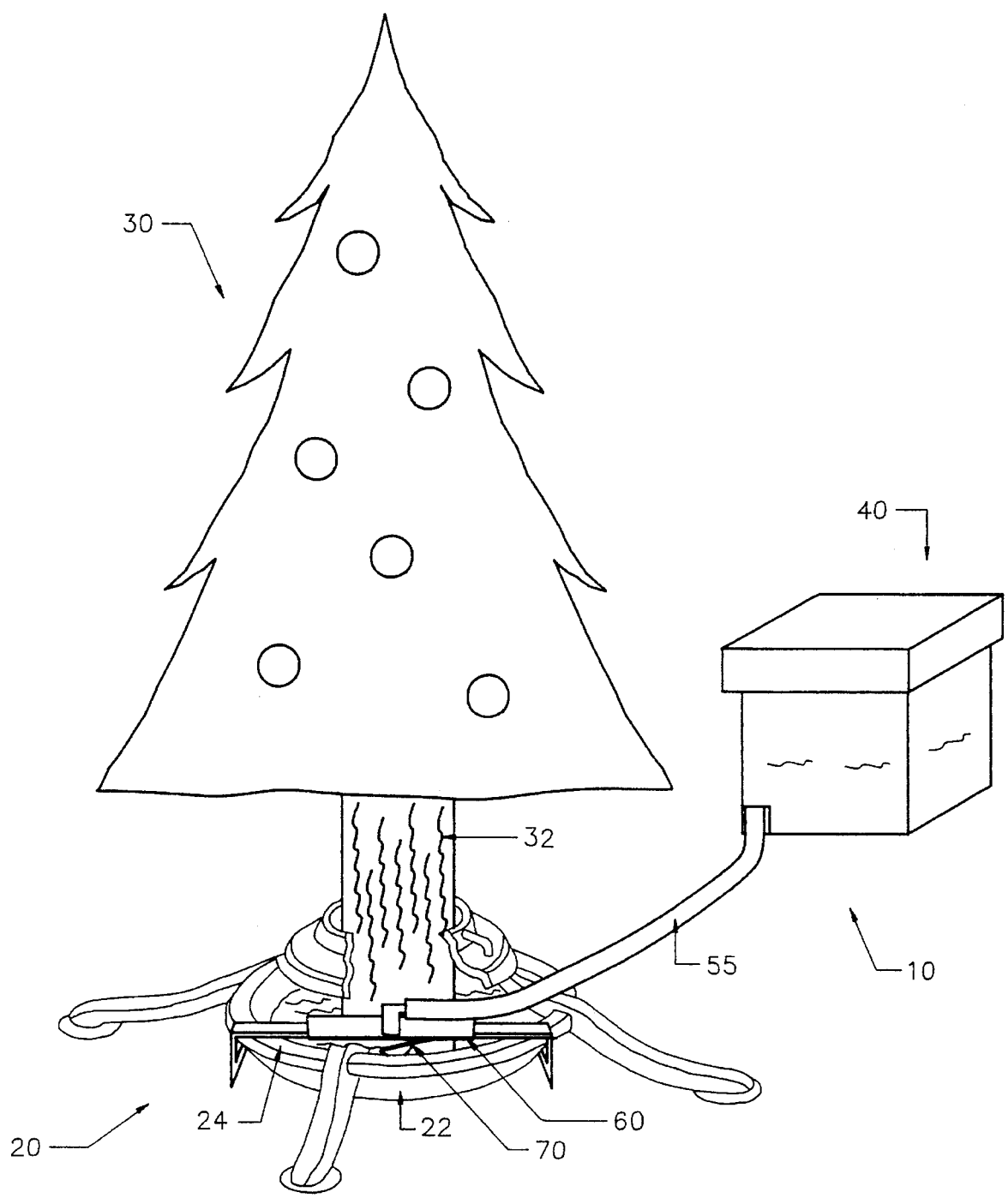
FIG. 1 is a perspective view of an exemplary embodiment of the automatic water level control system in use with a representative Christmas tree stand.

Referring to the drawings, FIG. 1 depicts an exemplary embodiment of the water level control system, generally referenced by the number 10, in use with a representative Christmas tree stand 20. Christmas tree stand 20 includes a watering basin 22 with an outer rim 24 for containing water for a Christmas tree 30. Stand 20 also includes a tree clamping mechanism 26 for holding the base 32 of tree 30 in an upright position. Water control system 10 includes a water supply container 40, a flexible conduit 55, an attachment mechanism 60, and a valve mechanism 70.

Referring to FIG. 2, water supply container 40 is shaped to resemble a Christmas present and includes four square sides 41, a square bottom 42, a top 43, a fluid opening 44, a reservoir cavity 45, an outlet port 46, and a recessed outlet port cavity 47. Sides 41 and bottom 42 form reservoir cavity 45 and are constructed of plastic. The top inside edges of adjoined sides 41 define fluid opening 44. Top 43 is constructed of plastic and is removable to allow reservoir cavity 45 to be filled with water or a similar liquid. In addition top 41 prevents foreign objects from entering reservoir cavity 45. Reservoir cavity 45 is in fluid communication with output port 46. Output port 46 is located within recessed cavity 47 of container 40 to prevent damage from inadvertent contact. Recessed cavity 47 is located on bottom 42 of water supply container 40. One of sides 41 has square opening 52 therethrough. Square opening 52 provides a passage for flexible conduit 55 to exit from water supply container 40 in a protected and inconspicuous manner.

A second exemplary embodiment of a water supply container is illustrated in FIG. 2A. Water supply container 40A is shaped to resemble a Christmas present and includes four square sides 41A, a square bottom 42A, a top 43A, a fluid opening 44A, a reservoir cavity 45A, an outlet port 46A, and a recessed outlet port cavity 47A. Sides 41A, bottom 42A, and top 43A form reservoir cavity 45A and are constructed of plastic. Top 43 has opening 44A therethrough to allow reservoir cavity 45A to be filled with water or a similar liquid. Reservoir cavity 45A is in fluid communication with output port 46A. Output port 46A is located within recessed cavity 47A of container 40A to prevent damage from inadvertent contact. Recessed cavity 47A is located on bottom 42A of water supply container 40A. One of sides 41A has square opening 52A therethrough which serves as a protected outlet for flexible conduit 55.

Figure 3:
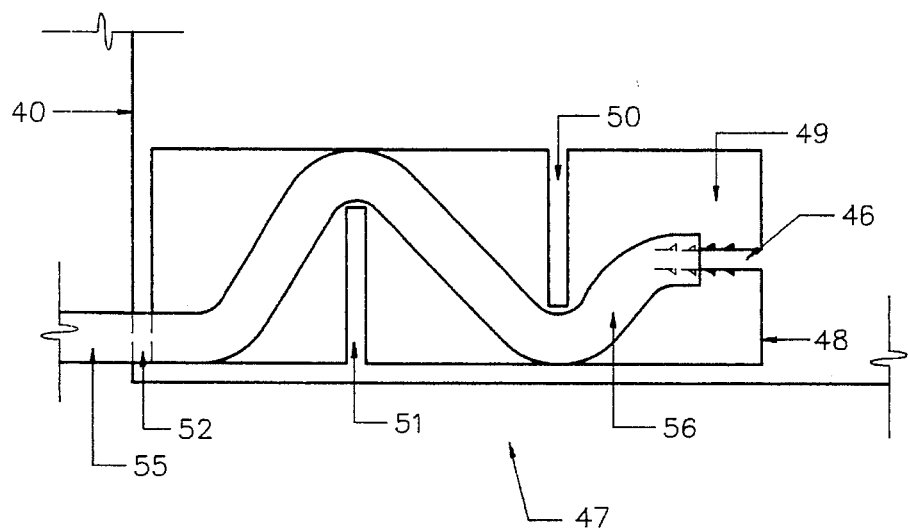
FIG. 3 is an elevation view of an exemplary embodiment of the water supply container and recessed cavity.

Referring to FIG. 3, an elevation view of water supply container 40 and recessed cavity 47 is shown. Recessed cavity 47 includes an outlet port wall 48, a recessed cavity side wall 49, and two tension walls 50, and 51. Outlet port 46 protrudes from and is centered, both horizontally and vertically, on outlet port wall 48. A first end 56 of flexible conduit 55 is disposed over outlet port 46. Flexible conduit 55 is about 10' in length and is constructed of resilient plastic tubing that is stretched to securely fit around output port 46. Tension walls 50 and 51 are constructed of plastic. Tension walls 50 and 51 are perpendicular to recessed cavity side wall 49 and project horizontally across recessed cavity 47. Flexible conduit 55 passes below tension wall 50, above tension wall 51, and through square opening 52 in side wall 41 which is parallel and in front of recessed cavity wall 48. When flexible conduit 55 is pulled by an external force tensional forces develop in flexible conduit 55. Tension walls 50 and 51 serve to dissipate and distribute to water supply container 40 these tensional forces that would otherwise reach the outlet port flexible conduit connection and potentially pull flexible conduit 55 from outlet port 46.

Figure 4:
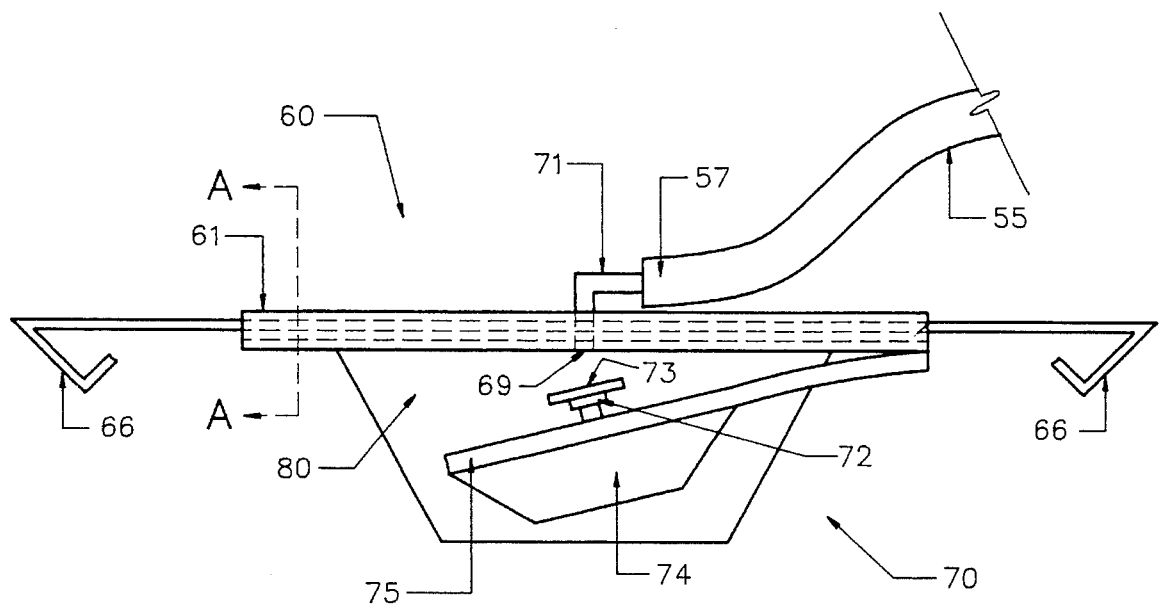
FIG. 4 is a side view of an exemplary embodiment of the attachment mechanism, valve mechanism, and shield member.

FIG. 4 is a side view of attachment mechanism 60, valve mechanism 70, and a shield member 80. Attachment mechanism 60 includes a main body 61 having an aperture 69, and two slidable hook members 66. Valve mechanism 70 includes a watering port 71, a valve seat 72 with a sealing surface 73, a float 74, and a flexion member 75. Watering port 71 is a rigid plastic tube in the shape of a 90 degree elbow adhesively attached within aperture 69 to main body 61. Flexible conduit 55 has a second end 57 disposed over and securely fit about watering port 71. Float 70 is constructed of buoyant plastic foam and angled at 45 degrees on each end to more closely resemble the interior contour of watering basin 22. Flexion member 75 is constructed of plastic and is fused to the bottom of main body 61 with adhesive. Float member 74 is located below and adhesively mounted to flexion member 75. Valve seat 72 is a step button constructed of rubber and is mounted above flexion member 75 opposite float member 74. With flexion member 75 supporting the total weight of float member 74 and valve seat 72, a minimum ⅛" space is maintained between sealing surface 73 and watering port 71 in the second predetermined direction.

Figure 5:
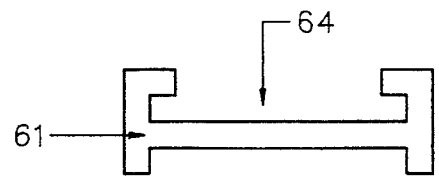
FIG. 5 is a cross section of an exemplary embodiment of the main body of the attachment mechanism.

FIG. 5 is a cross section A—A of FIG. 4 illustrating main body 61 with hook member 66 removed. Main body 61 is shaped to form a C-shaped raceway 64. Main body 61 is constructed of plastic.

Figure 6:
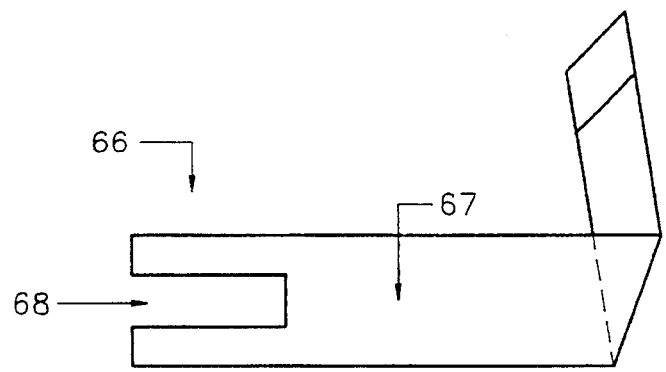
FIG. 6 is a top view of an exemplary embodiment of a hook member of the attachment mechanism.

FIG. 6 is a top view of one of hook members 66. Hook members 66 include an extension section 67 having a slot opening 68, and are constructed of plastic.

Figure 7:
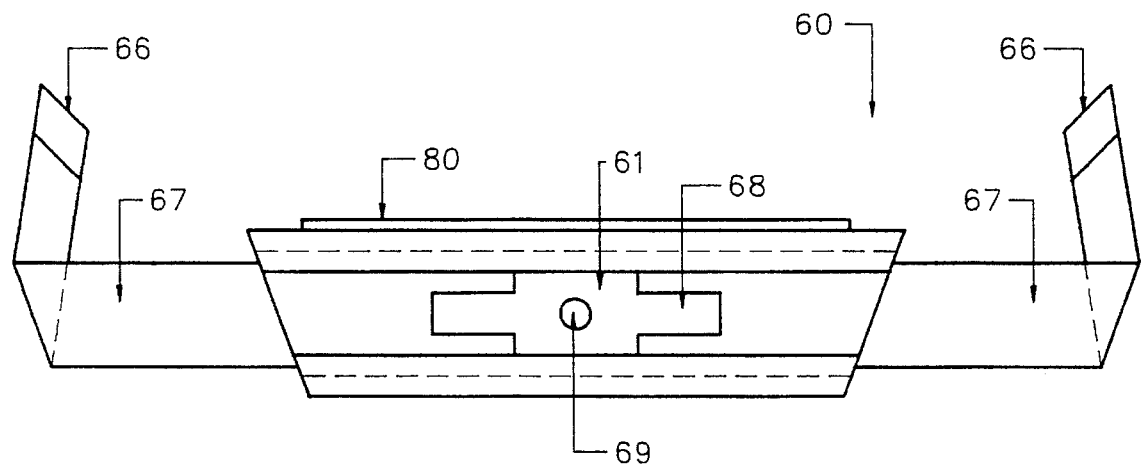
FIG. 7 is a top view of an exemplary embodiment of the attachment mechanism.

FIG. 7 is a top view of attachment mechanism 60 and shield member 80. Aperture 69 is located in the center of main body 61. Aperture 69 has a circumference greater than the outside diameter of watering port 71 such that watering port 71 may fit within aperture 69. Extension section 67 of hook member 66 is slidable inside raceway 64 (FIG. 5) of main body 61.

Operation of automatic water level control system 10 is now described with reference to the aforementioned figures. Attachment mechanism 60 is positioned on and above watering basin 22 so that shield member 80 is located between Christmas tree base 32 and float 74. Extension sections 67 are inserted into raceway 64 until hook members 66 partially encircle outer rim 24 so that attachment mechanism 60 is prevented from moving vertically with respect to Christmas tree stand 20.

Water supply container 40 is placed in an inconspicuous place within close proximity of Christmas tree stand 20. Top 43 is removed and reservoir cavity 45 is filled with water to within 2" of fluid opening 44. The fluid level in reservoir cavity 45 must be above watering port 71. Top 43 is replaced. Water flows from watering port 71 into watering basin 22. As the water level in watering basin 22 rises the buoyancy of float 74 causes float 74 to rise. The upward force exerted by float 74 on flexion member 75 causes flexion member 75 to flex. Sealing surface 73 is forced into contact with and closes watering port 71. As a result of evaporation and the absorption of water by tree 30 the water level in watering basin 22 lowers. Float 74 lowers accordingly. With the force due to buoyancy of float 74 no longer acting upon flexion member 75, sealing surface 73 is drawn downward from watering port 71. Water again flows from watering port 71 and the cycle is repeated.

It can be seen from the preceding description that a device for maintaining a relatively constant water level in a Christmas tree stand, which will not jam as a result of operating in liquid solution laden with sugar or a similar substance, will operate in conjunction with existing Christmas tree stands of various sizes, and is unobtrusive, inexpensive, and simple to install has been provided.

It is noted that the embodiment of the Automatic water level control system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. In a Christmas tree stand water level control system of the type for use with Christmas tree stands having a water basin, and that include a valve assembly having a valve body supporting a fluid output port positionable within the water basin of the Christmas tree stand and a float assembly having a sealing surface, in connection with a buoyant body, that engages and seals the fluid port in response to movement of the buoyant body in a first predetermine direction; a flexible conduit having a first end attachable to a remote water reservoir and a second end in connection with the valve assembly; and a securing mechanism for securing the valve assembly in a position with respect to the Christmas tree stand to allow the valve assembly to provide water to the water basin from the remote reservoir, through the flexible conduit, and out through the fluid output port when the water level within the water basin falls beneath a first predetermined level; the improvement comprising:

a flexion member having a first end rigidly secured to said valve body and a second end rigidly secured to said float assembly in a manner such that movement of said float assembly with respect to said fluid port requires said flexion member to flex, the weight of said float assembly and the resilience of said flexion member being selected in a manner such that the force of gravity acting on the float assembly is a force sufficient to bias said sealing surface out of a sealing relationship with said fluid port, the buoyancy of said buoyant body being selected to provide a buoyant force sufficient to force said sealing surface into sealing relationship with said fluid port.

* * * * *